(12) United States Patent
Deininger et al.

(10) Patent No.: US 9,509,172 B2
(45) Date of Patent: Nov. 29, 2016

(54) CHARGING DEVICE FOR CHARGING THE ENERGY STORE OF A PORTABLE ELECTRIC DEVICE

(71) Applicant: CONTI TEMIC MICROELECTRONIC GMBH, Nuremberg (DE)

(72) Inventors: Jochen Deininger, Kisslegg (DE); Lothar Schauer, Markdorf (DE); Michael Tress, Friedrichshafen (DE); Thomas Zoelle, Constance (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 277 days.

(21) Appl. No.: 14/369,767

(22) PCT Filed: Dec. 18, 2012

(86) PCT No.: PCT/EP2012/076012
§ 371 (c)(1),
(2) Date: Nov. 5, 2014

(87) PCT Pub. No.: WO2013/098133
PCT Pub. Date: Jul. 4, 2013

(65) Prior Publication Data
US 2015/0048787 A1  Feb. 19, 2015

(30) Foreign Application Priority Data

Dec. 29, 2011  (DE) .................. 10 2011 090 131

(51) Int. Cl.
*H02J 7/02* (2016.01)
*H02J 7/00* (2006.01)
(Continued)

(52) U.S. Cl.
CPC ............ *H02J 7/025* (2013.01); *H02J 5/005* (2013.01); *H02J 7/007* (2013.01); *H02J 7/0013* (2013.01); *H04B 5/0037* (2013.01); *H04B 5/0081* (2013.01)

(58) Field of Classification Search
CPC .......................... H02J 7/025; H02J 7/007
USPC ............................. 320/108, 137
See application file for complete search history.

(56) References Cited

U.S. PATENT DOCUMENTS 5,923,544 A   7/1999  Urano
6,118,249 A   9/2000  Brockmann et al.
(Continued)

FOREIGN PATENT DOCUMENTS

DE    19741279 A1   3/1999
DE    19837675 A1   2/2000
(Continued)

*Primary Examiner* — Sun Lin
(74) *Attorney, Agent, or Firm* — Laurence A. Greenberg; Werner H. Stemer; Ralph E. Locher

(57) ABSTRACT

A charging device for charging an energy storage device of a portable electric device. The charging device has a load cell or load cells, each load cell is equipped with a controllable resonant circuit for inductively transmitting energy, a parallel resonant circuit with two coils and a controllable supply voltage, two controllable switching elements for a self-oscillation of the parallel resonant circuit, which have control connections that can be connected to each other via a respective controllable switch-off element, and a demodulator connected to an output of the load cell being formed by a coil end of one coil of said two coils, wherein said coil end is not connected to a coil end of another coil of said two coils. The self-oscillation can be interrupted in a controlled manner by switching the two controllable switching elements in order to modulate an amplitude of an electromagnetic field generated by the two coils.

14 Claims, 4 Drawing Sheets

(51) Int. Cl.
 *H02J 5/00* (2016.01)
 *H04B 5/00* (2006.01)

(56) References Cited

U.S. PATENT DOCUMENTS

| | | |
|---|---|---|
| 8,587,154 B2 | 11/2013 | Fells et al. |
| 2005/0156560 A1 | 7/2005 | Shimaoka et al. |
| 2010/0259217 A1 | 10/2010 | Baarman et al. |
| 2012/0087154 A1 | 4/2012 | Maisel et al. |

FOREIGN PATENT DOCUMENTS

| | | |
|---|---|---|
| DE | 102008018829 A1 | 10/2009 |
| DE | 102009004225 A1 | 7/2010 |
| JP | H1092673 A | 4/1998 |
| JP | H11178248 A | 7/1999 |
| JP | 2011109810 A | 6/2011 |
| WO | 2009027674 A1 | 3/2009 |

CHARGING DEVICE FOR CHARGING THE ENERGY STORE OF A PORTABLE ELECTRIC DEVICE

BACKGROUND OF THE INVENTION

Field of the Invention

The invention relates to a charging device for charging the energy store of a portable electrical device having at least one load cell which comprises a controllable resonant circuit for inductively transferring energy.

The rising interest in charging the energy stores of portable electrical devices, for instance mobile telephones, smartphones, tablet PCs, etc., in an efficient and convenient manner recently led to proposals for standardized wireless interfaces between a charging device and the electrical device to be charged. In order to configure the charging process to be efficient, inductive charging processes are provided. In particular, it is to be ensured that no energy or as little energy as possible is consumed while an electrical device is not being charged, even if the charging device is connected to a power supply system, for example a 230 V power supply system or a motor vehicle onboard power supply system.

The charging of the energy stores is often based on an inductive near-field coupling of flat coils which, when excited in series resonance with a capacitor, enable not only charging energy but also data to be communicated to the electrical device to be charged. In this case, on the part of the charging device, the communication takes place by the amplitude of the electromagnetic field of the charging energy being modulated. On the part of the energy receiver, that is to say the electrical device to be charged, the load is modulated, whereby a bidirectional transfer of data is possible as a result.

In addition to the distance between the coils of the charging device and an electrical device to be charged, and a resonant frequency, a coil current which determines the electromagnetic flux is particularly vital for the efficient inductive transfer of energy. Arrangements with semiconductor changeover switches are used to generate said AC coil current, said semiconductor changeover switches being operated in half-bridge and full-bridge circuits. The necessity for a separate, alternating actuation of the semiconductor switching elements, for example by means of a microprocessor, is common to both bridge circuits. The more precisely the frequency of the alternating actuation of the semiconductor switching elements matches the series resonant frequency of the resonant circuit, the greater the efficiency of the system. The series resonant frequency of the resonant circuit is determined by the tolerances of the components involved, the temperature, the resonant detuning and the coupling conditions between charging device and electrical device. A decrease in the efficiency is compensated by step-up converters which, owing to their relatively high voltage which is applied to the changeover switches, enable a relatively high coil current to be generated. Likewise, semiconductor switches which have relatively low internal resistances are used in the bridges. However, in this connection, the components required to realize the charging device are increased in price.

BRIEF SUMMARY OF THE INVENTION

It is the object of the present invention to specify a charging device which is improved in terms of the achievable efficiency and in terms of cost.

Said object is achieved by a charging device and a method for charging the energy store according to the features of the independent claims. Advantageous configurations are specified in the dependent claims.

The invention achieves a charging device for charging the energy store of a portable electrical device having at least one load cell which comprises a controllable resonant circuit for inductively transferring energy. The load cell comprises a parallel resonant circuit having two coils and having two controllable switching elements for self-oscillation of the parallel resonant circuit, wherein the parallel resonant circuit is supplied with a controllable supply voltage. In particular, the parallel resonant circuit is a self-oscillating push-pull oscillator. The control connections of the two controllable switching elements of the parallel resonant circuit are connectable to one another via a respective controllable switch-off element, whereby the self-oscillation can be interrupted in a targeted manner in order to modulate the amplitude of the electromagnetic field generated by the coils. Furthermore, a demodulator is connected to an output of the parallel resonant circuit, wherein the output is formed by the coil end of one of the two coils, which coil end is not connected to a coil end of the other flat coil and forms an output of the load cell.

The use of a parallel resonant circuit enables bridge circuits and the expensive low-impedance semiconductor switches for alternating actuation to be dispensed with. As a result, the charging device can be provided with a relatively high efficiency with relatively low costs. At the same time, bidirectional communication can take place by controlling the switch-off elements to modulate the amplitude of the electromagnetic field generated by the coils. Since the parallel resonant circuit can be switched off in a very short period of time by the switch-off elements, a high rate of data transfer can be achieved. Provision of the demodulator at the output of the parallel resonant circuit also makes it possible to evaluate the telegram transmission performed by load modulation on the part of the electrical device to be charged, the loading of the amplitude being evaluated by the demodulator in the event of a freely oscillating parallel resonant circuit.

Expediently, the control connections of the switch-off elements can have the same control signal applied thereto, with the result that the self-oscillation of the parallel resonant circuit can be interrupted in a very short period of time.

In another configuration, the control connections of the two controllable switching elements of the parallel resonant circuit are connectable to a reference potential via the load paths of the switch-off elements. As a result of this, it is ensured that the self-oscillation is reliably interrupted within a very short period of time by means of the switching elements of the parallel resonant circuit.

The coils are preferably flat coils which, in particular, at least partially overlap. Thus, a greater surface area can be provided for the transfer of electrical energy for charging the energy store of the electrical device in comparison with a charging device having a series resonant circuit.

It is also expedient for the adjustable voltage for supplying the parallel resonant circuit to be provided by a controllable voltage regulator, wherein the energy transferred to the terminal is controllable as a function of the level of the voltage. In particular, this is used to adapt the charging current into the energy store of the electrical device on the basis of a previous communication between charging device and the electrical device to be charged.

It is also expedient for a microcontroller to be provided to generate control signals for the controllable voltage regulator and the switch-off elements. The microcontroller is used to control the switch-off elements according to a predefined data protocol in order to modulate the amplitude to transfer data to the electrical device. Likewise, the microcontroller is used to evaluate the demodulation signal generated by the demodulator. For this purpose, the microcontroller is expediently connected to an output of the demodulator.

The charging device can comprise a plurality of load cells to form a load array. By means of a load array, a large surface area on which to place the electrical device to be charged can be provided. In this case, appropriate changeover elements and control electronics ensure that one or more of the load cells is or are used in a targeted manner to charge the energy store of the electrical device. Thus, the energy consumption of the electrical device can be kept to a minimum during the charging process. Preferably, the coils of one of the load cells are arranged so as to at least partially overlap the coils of adjacent other ones of the load cells.

In the case of a plurality of load cells, it is also provided that a respective output of the load cells is coupled to the input of the demodulator via a capacitor. In one configuration, the demodulation is performed for all load cells with a common demodulator, wherein the capacitive decoupling is necessary owing to the transfer of a high-frequency alternating signal to the demodulator.

In another configuration, at least two demodulators are provided, the inputs of said demodulators being connectable to a respective output of the load cells via an associated changeover switch, wherein one of the load cells is connected to one of the demodulators and, meanwhile, the other load cells are connected in sequence to one of the other demodulators. As a result, it is possible to determine whether, in addition to the electrical devices, other foreign bodies are also present on a surface of the charging device, which foreign bodies can influence the charging process or lead to unnecessary energy consumption.

The invention also provides a method for charging the energy store of a portable electrical device having a charging device of the type described above. In the case of the method, the switch-off elements switch the self-oscillating parallel resonant circuit on or off according to a predefined data protocol, while the voltage regulator provides the supply voltage for the load cell, whereby the self-oscillation of the parallel resonant circuit is interrupted and the amplitude of the electromagnetic field generated by the coils is modulated.

In particular, in a variant of the method, it can be provided that, by means of the data protocol, the amplitude of one or, alternatively, more load cells, which are switched on at the same time, is modulated by means of appropriate actuation of the switch-off elements. Thus, a message can be sent from several load cells at once to the electrical device to be charged. Likewise, the amplitude can be modified by changing the voltage supply in order, for example, to reduce the charging current in the energy store of the electrical device to be charged.

The demodulation of the load cells is preferably performed using a common demodulator. If a plurality of demodulators are provided, each of the demodulators with a demodulation output are changed over by means of a changeover switch.

BRIEF DESCRIPTION OF THE SEVERAL VIEWS OF THE DRAWING

The invention is explained in more detail below with reference to exemplary embodiments in the drawings, in which.

DESCRIPTION OF THE INVENTION

Figure 1:
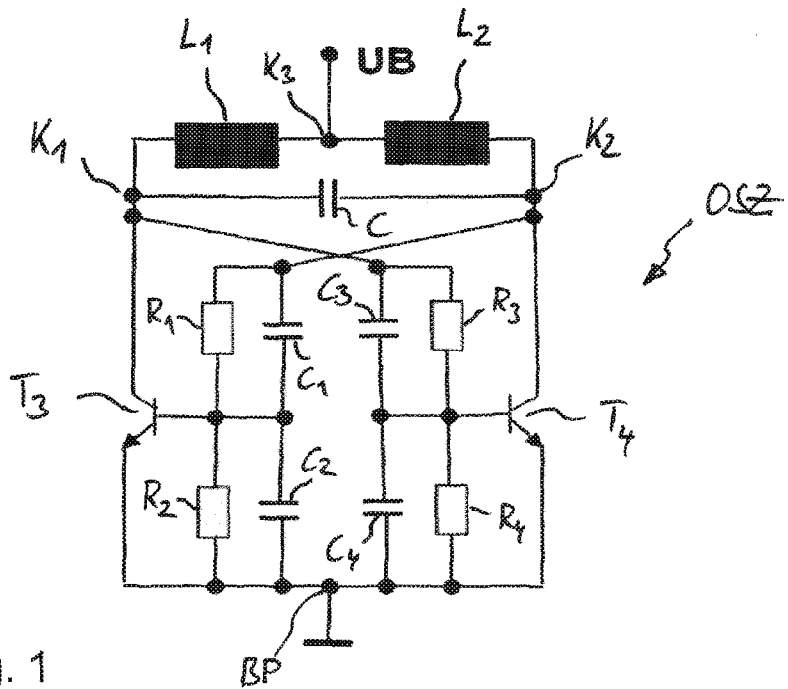
FIG. 1 shows the circuit arrangement of a push-pull oscillator known from the prior art.

FIG. 1 shows the circuit arrangement of a self-oscillating oscillator (OSZ) known from the prior art. The circuit arrangement illustrated in FIG. 1 is known as a push-pull oscillator. Said push-pull oscillator consists of two Meißner oscillators. The circuit arrangement comprises a parallel resonant circuit having two coils $L_1$, $L_2$ and a capacitor C. A supply voltage UB is applied to the node $K_3$ between the two coils. A node $K_1$ between the coil $L_1$ and the capacitor C is connected to a reference potential BP via a semiconductor switching element $T_3$. Correspondingly, a node $K_2$ between the coil $L_2$ and the capacitor C is coupled to a reference potential BP via a semiconductor switching element $T_4$. The reference potential BP is preferably provided by a ground connection. The semiconductor switching elements are designed as bipolar transistors. The base connection of the transistor $T_3$ is connected to an ohmic voltage divider formed from the resistors $R_1$, $R_2$ and to a capacitive voltage divider formed from the capacitors $C_1$, $C_2$. The two voltage dividers are connected between the node $K_2$ of the coil $L_2$ and the capacitor C of the parallel resonant circuit and the reference potential BP. Analogously hereto, the base connection of the transistor $T_4$ is connected to an ohmic voltage divider $R_3$, $R_4$ and a capacitive voltage divider $C_3$, $C_4$. The two voltage dividers are connected between the node $K_1$ of the coil $L_1$ and the capacitor C of the parallel resonant circuit and the reference potential BP.

At the instant of connecting the supply voltage UB, all of the capacitors C, $C_1$, $C_2$, $C_3$, $C_4$ are discharged, whereby a pulsed total current flows through the circuit arrangement. Said total current is composed of current components of the collector currents of the push-pull transistors $T_3$, $T_4$ and the current components of the capacitive voltage dividers $C_1$, $C_2$ or $C_3$, $C_4$. A continuously present slight imbalance in the branches of the push-pull oscillator leads to the voltage potential of either the node $K_1$ or $K_2$ of the coil arrangement $L_1$, $L_2$ decreasing to the reference potential BP via the transistors $T_3$, $T_4$ and, at the same time, the return branch conducting increasingly less current. Hence, the return branch causes a positive potential at the associated coil connection. As a result, the resonant circuit capacitor C is charged. Likewise, a flow of current is induced in the coil arrangement $L_1$, $L_2$ by the applied supply voltage UB, which flow of current discharges the capacitor.

The strength of said discharge current first rises more markedly and then more slowly. The rising current increases the flow in the coil arrangement $L_1$, $L_2$. Thus, a voltage is induced by the coil arrangement $L_1$, $L_2$, which voltage opposes its cause. While the voltage is reduced more and more markedly until it eventually reaches zero, the current strength reaches a maximum. At the same time, the magnetic field strength of the coil arrangement $L_1$, $L_2$ is at a maximum and the capacitor is fully discharged. The total energy is therefore stored as magnetic field energy in the coil arrangement $L_1$, $L_2$ in the coil.

As soon as the current reaches the peak, it drops, which leads to the magnetic flux density in the coil arrangement $L_1$, $L_2$ decreasing. An induction voltage develops, which voltage opposes its cause, and so the current strength only drops slowly at first and the resonant circuit capacitor C is oppositely charged. The voltage across the resonant circuit capacitor C now increases again, however now with opposite polarity. While the current strength in the resonant circuit capacitor C drops further, the resonant circuit capacitor C obtains renewed charge, that is to say electrical energy from the magnetic field of the coil. Thus, a part of the energy lost from the parallel resonant circuit is supplied thereto in a balancing manner through the push-pull transistors $T_3$, $T_4$.

In the following exemplary embodiments, which are described in more detail, of charging devices according to the invention for charging the energy store of a portable electrical device, for instance a mobile telephone, an audio and/or video player, a smartphone, a tablet PC, etc., the above described push-pull oscillator is used, wherein, by modification of said push-pull oscillator, bidirectional communication between the charging device and the electrical device to be charged is made possible at the same time, in addition to the transfer of inductive energy.

In contrast to conventional charging devices which are constructed according to the standard of the Wireless Power Consortium WPC, the present charging device does not use any series resonant circuit primary coils for inductive energy transfer, but rather the parallel resonant circuit described in connection with FIG. 1. Thus, the charging device can be provided more cost-effectively since low-impedance coil current changeover switches, in general half-bridges or full-bridges using MOSFETs, for controlling the resonant circuit can be dispensed with. As will become apparent from the following description, a charging device having a parallel resonant circuit is distinguished by higher efficiency as a result of the self-inductance which is required in principle. An improved EMC behavior can also be achieved by the formation of a sinusoidal harmonic coil current, which is also required in principle.

As in the case of the charging devices using series resonant circuits, the bidirectional data communication takes place, on the part of the charging device, by modulation of the amplitude of the electromagnetic field of the charging energy and, on the part of the energy receiver, that is to say the electrical device to be charged, by modulation of the load. The bidirectional communication is used, inter alia, to control the charging process.

Figure 2:
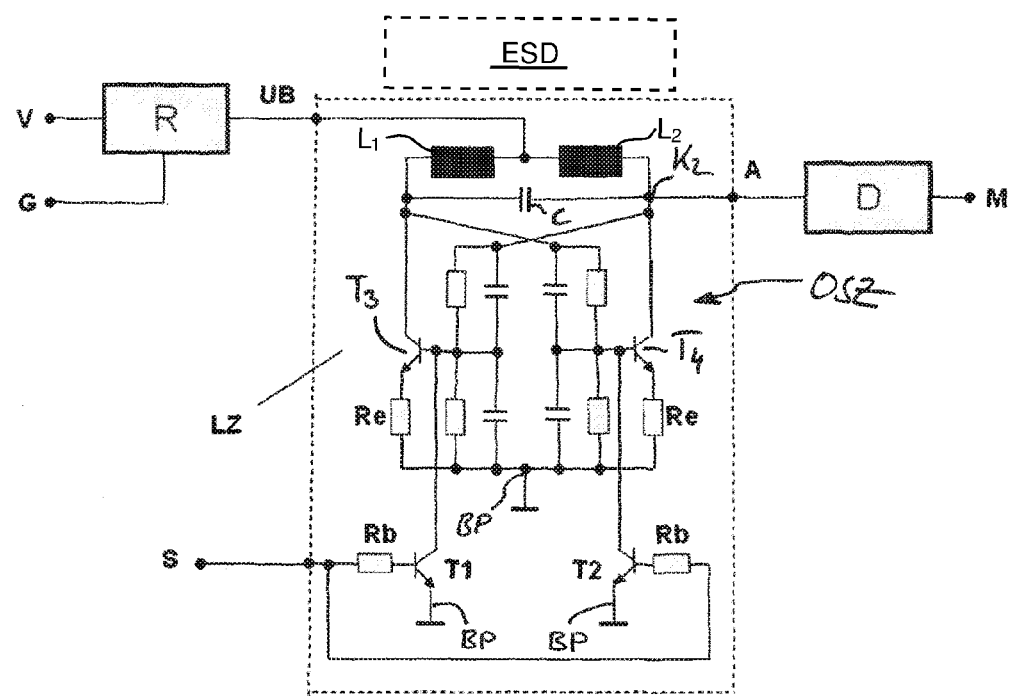
FIG. 2 shows an electrical equivalent circuit diagram of a charging device according to the invention having a single load cell.

FIG. 2 shows an electrical equivalent circuit diagram of a charging device according to the invention, which is based on a modified push-pull oscillator according to FIG. 1. The modified push-pull oscillator is comprised in a load cell LZ. The load cell has an input for the supply voltage UB, which is provided by a voltage regulator R. By means of the voltage regulator R, the field energy of the load cell is controlled. The voltage regulator R can be controlled, for example, by means of pulse-width modulation. An actuation input of the voltage regulator R is labeled G. A supply voltage of the voltage regulator R is labeled V.

The supply voltage UB can be switched on and off and the level thereof can be modified by means of the voltage regulator R. The energy provided from the load cell LZ for transfer to the electrical energy store ESD (enemy storage device) to be charged can be influenced by the level of the supply voltage UB. In particular, it is possible to reduce the energy in a predetermined way towards the end of the charging process. The control process is based here on the communication conducted between the charging device and the electrical device to be charged.

An output A of the load cell LZ is connected to a demodulator D. The output A of the load cell is formed by the node K2 of the modified push-pull oscillator. A demodulated signal M is provided at the output of the demodulator, which signal can be fed to a microcomputer for further processing.

The load cell LZ emerges from the connection of additional switch-off elements $T_1$, $T_2$ at the bases of the push-pull transistors $T_3$, $T_4$ of the push-pull oscillator. The switch-off elements $T_1$, $T_2$ are designed, by way of example, as bipolar transistors, wherein MOSFETs could equally be used. In the exemplary embodiment shown in FIG. 2, the collectors of the transistors $T_1$, $T_2$ are connected to bases of the push-pull transistors $T_3$, $T_4$. The respective emitters are connected to reference potential BP, preferably ground. The bases of the switch-off transistors $T_1$, $T_2$ are connected together to a control input S of the load cell LZ via series resistors Rb.

By actuation with a positive potential at the control input S, the push-pull transistors $T_3$, $T_4$ are switched so as to be de-energized, since the bases thereof are connected to the reference potential BP.

As a result of this, active energy-resupply of the parallel resonant circuit by the alternating through-connection of the transistors $T_3$, $T_4$ of the push-pull oscillator to reference potential BP is avoided. Thus, the resonant circuit loses energy and the amplitude of the circuit decays. The decay process can in this case be achieved within a very short period of time, and so a 100% modulation of the amplitude can be generated by the switching of the switch-off transistors $T_1$, $T_2$. The described oscillation process of the push-pull oscillator is released again by a corresponding signal at the control input S by a low potential being applied there. This prevents base currents in the bipolar transistors $T_1$ and $T_2$ and hence the switch-off transistors being switched on. Owing to the natural imbalance in the push-pull oscillator, it starts up again immediately, provided the supply voltage UB is applied.

The emitter resistors Re provided between the emitters of the push-pull oscillators $T_3$, $T_4$ and the reference potential improve the balancing of the branches in the push-pull oscillator. By means of these resistors, leakage, current amplification and base-emitter voltage are compensated.

It is clear to a person skilled in the art that the arrangement could also be realized with interchanged polarity of the supply voltage and suited transistors (pnp transistors instead of the illustrated npn transistors).

Thus, messages are sent from the charging device to the device to be charged by switching the switch-off transistors $T_1$, $T_2$ of the load cell. As a result of this, the described amplitude modulation is achieved. If, however, messages from the electrical device to be charged are to be received by the charging device, then the switch-off transistors $T_1$, $T_2$ are switched so as to have high impedance, and so the push-pull oscillator can freely oscillate. In this case, the amplitude of the oscillation of the push-pull oscillator is loaded by a load modulation performed by the device, wherein said loading can be detected and evaluated by the demodulator D.

The demodulator D illustrated in FIG. 2 is capacitively connected to the output A of the load cell, wherein a capacitor necessary for this is provided in the demodulator in a known manner. In an equally known manner, the demodulator comprises a filter, an amplifier and a threshold-value comparator. The demodulated signal M is fed as useful signal to the previously mentioned microcomputer for further processing.

One advantage of using a parallel resonant circuit of the described type also consists in that, by means of the load cell of the charging device according to the invention, a greater surface area can be provided for the charging process in comparison with known series resonant circuits. This is achieved in that the coils $L_1$, $L_2$ of the push-pull oscillator, which coils are designed as flat coils, are preferably arranged so as to partially overlap. It is likewise possible to allow the coils $L_1$, $L_2$ to fully overlap. The degree of overlap depends, inter alia, on how strongly the oscillation of the push-pull oscillator is to resemble a sine wave.

Figure 3:
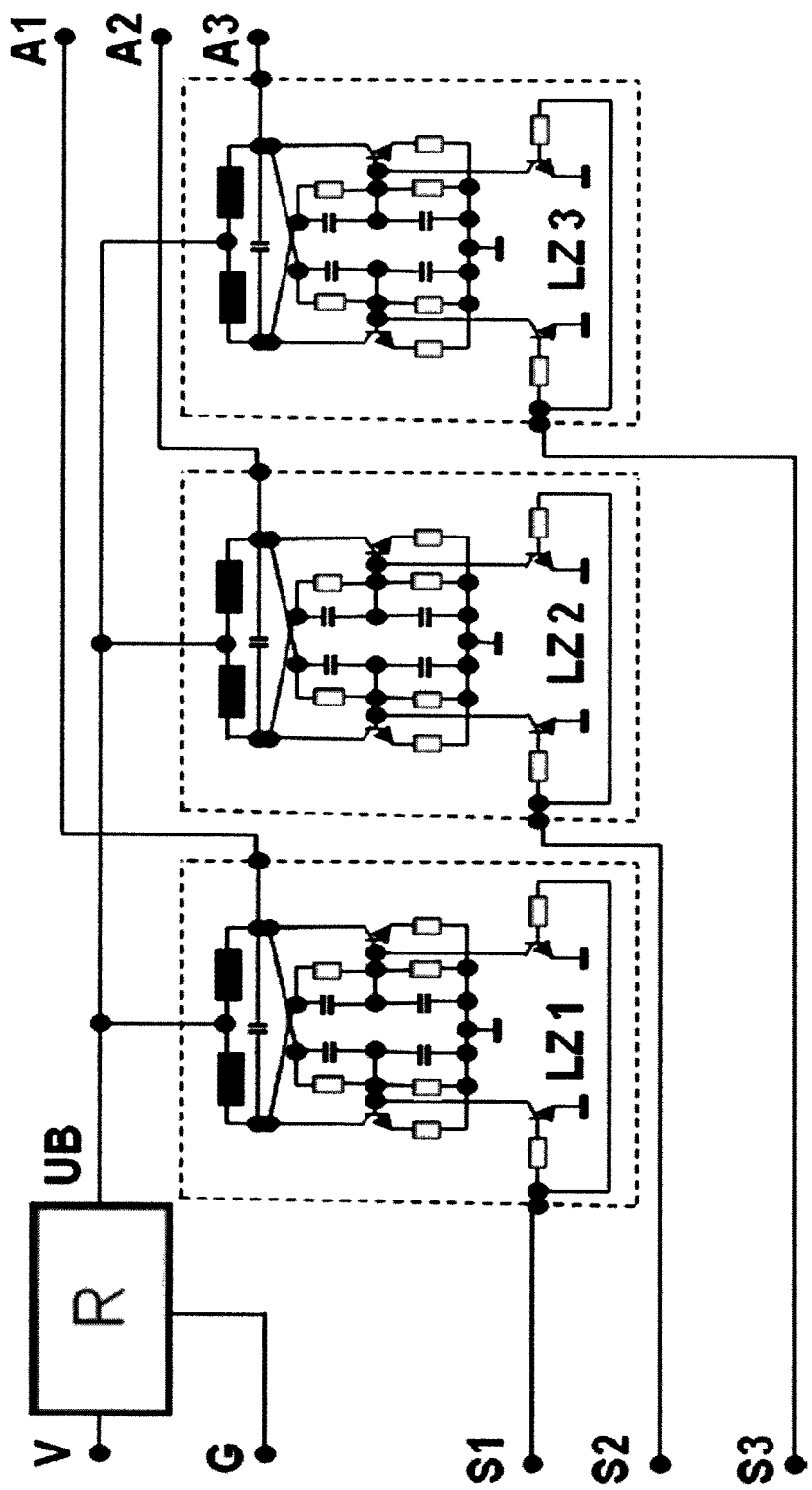
FIG. 3 shows an electrical equivalent circuit diagram of a charging device according to the invention having, for example, three load cells.
Figure 4:
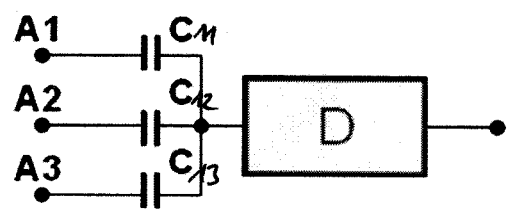
FIG. 4 shows a schematic illustration of the connection of the, for example, three load cells from the exemplary embodiment according to FIG. 3, with a single demodulator.

In principle, the charging device according to the invention can be equipped with an arbitrary number of load cells, as was described in FIG. 2. By way of example, FIG. 3 shows a charging device according to the invention, which charging device comprises three load cells $LZ_1$, $LZ_2$, $LZ_3$ which are all supplied from an adjustable supply voltage UB. Each of the load cells has a control input $S_1$, $S_2$, $S_3$ to which a respective control signal for amplitude modulation of the electromagnetic field generated by the push-pull oscillator can be applied. If only one of the load cells $LZ_1$, $LZ_2$, $LZ_3$ is switched on (by two of the load cells $LZ_1$, $LZ_2$, $LZ_3$ being switched off by means of an appropriate control signal at the control inputs of said load cells), the demodulation signal can be tapped at the respectively associated demodulation outputs $A_1$, $A_2$, $A_3$. FIG. 4 shows the capacitive connection of the three demodulation outputs $A_1$, $A_2$, $A_3$ which is then necessary, wherein only a single demodulator D is provided. In order to prevent the outputs $A_1$, $A_2$, $A_3$ from being short-circuited, the capacitive coupling may no longer take place within the demodulator. For this reason, the corresponding capacitors $C_{11}$, $C_{12}$, $C_{13}$ are provided as external components.

Figure 5:
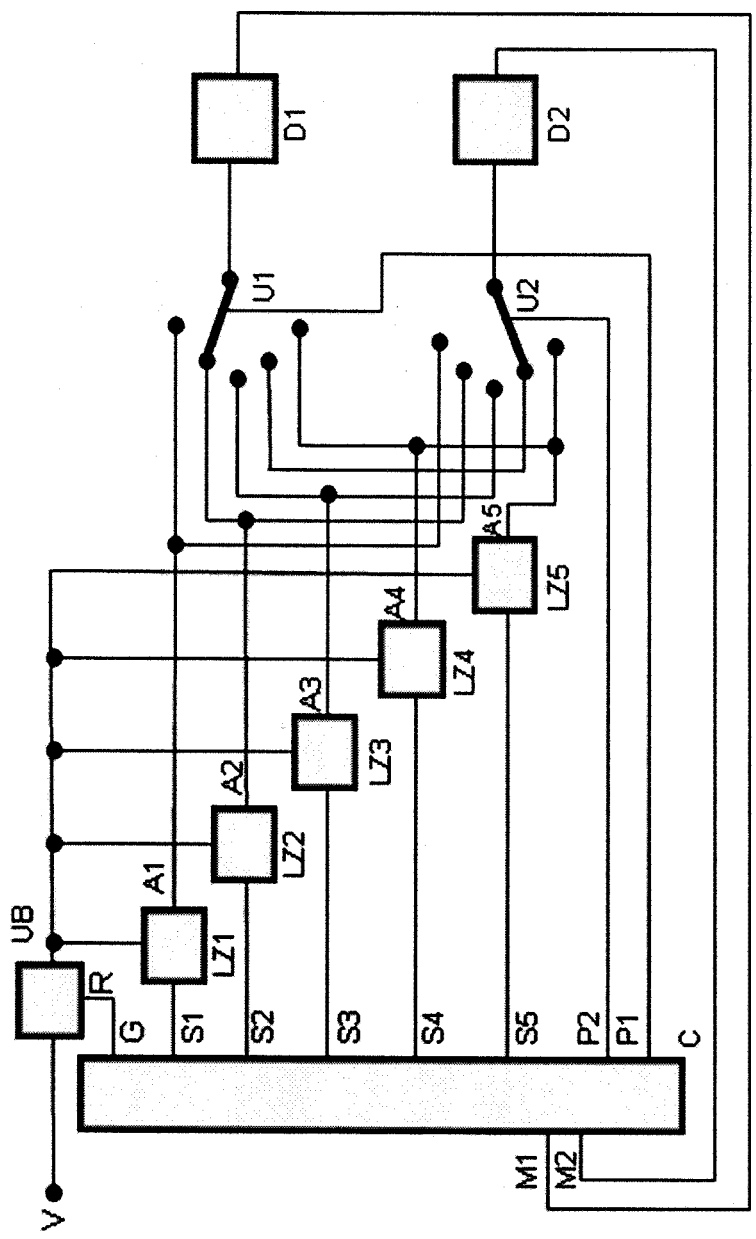
FIG. 5 shows a schematic illustration of a charging device according to the invention having, for example, five load cells which are coupled to, for example, two demodulators.

FIG. 5 shows another exemplary embodiment for a total of five load cells $LZ_1, \ldots, LZ_5$, which are connected to a common adjustable, controllable voltage source R for providing the supply voltage UB. The demodulation outputs $A_1, \ldots, A_5$ of said load cells are connected via changeover switches $U_1$ and $U_2$ to two demodulators $D_1$, $D_2$. A microcomputer (for example, a microcontroller) is denoted by C, said microcomputer being connected to the outputs of the demodulators $D_1$, $D_2$, with the result that the demodulation signals $M_1$, $M_2$ can be fed to the microcomputer C. The outputs of the microcontroller C are connected to the control inputs $S_1, \ldots, S_5$ of the respective load cells $LZ_1, \ldots, LZ_5$. In addition, the microcontroller is used to control the changeover switches $U_1$, $U_2$, the control inputs of which are connected to control outputs $P_1$, $P_2$. The common supply voltage UB of the load cells $LZ_1, \ldots, LZ_5$ is given by the actuating signal G from the microcontroller.

If all of the load cells $LZ_1, \ldots, LZ_5$ are switched off, a residual current consumption remains which is further reduced if the supply voltage UB is switched to 0 V. Alternatively, the common supply voltage UB or the common ground potential can be extracted from the load cells via an additional switching transistor to reduce the no-load current.

The pulse-width set by the microcomputer C determines the coil current of the respective push-pull oscillators by the voltage regulator consisting, in its simplest embodiment, of an actuator with pulse-width controller, actuated by the signal G. As a result, preconditions are provided to charge external devices according to the regulations for data exchange set by the WPC.

Figure 6:
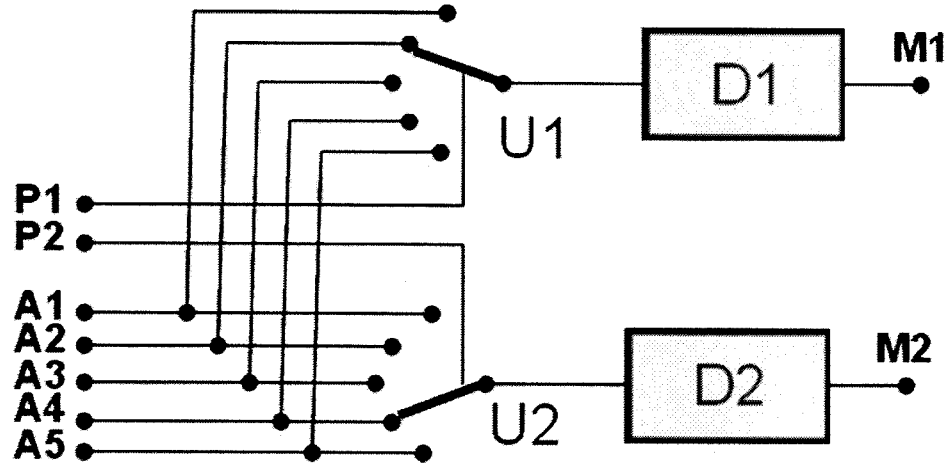
FIG. 6 shows an embodiment of the connection of five load cells to two independently controllable changeover switches which are connected to respectively associated demodulators.

FIG. 6 shows the changeover device for the five demodulation outputs $A_1, \ldots, A_5$ which are selectively connected to the two demodulators $D_1$, $D_2$ via the changeover switches $U_1$, $U_2$. In this case, the changeover switches $U_1$ and $U_2$ are switched by means of signals at the control outputs $P_1$ and $P_2$. In the present exemplary embodiment, the load cell $LZ_2$ is connected to the demodulator $D_1$. The rest of the load cells $LZ_1$, $LZ_3$, $LZ_4$, $LZ_5$ are selectively connected in sequence to the demodulator $D_2$ via the changeover switch $U_2$. Thus, it can be determined whether, in addition to the electrical device to be charged, further objects which cause energy consumption, for instance coins or keys, are also on the charging device in the region of the other load cells. If no such foreign objects are present on the charging device, a known coupling exists. In the event of foreign objects being present, an over coupling occurs which makes itself noticed by means of a change in the field and which can be detected by the microcomputer by demodulation and processing of the demodulation signal.

An arrangement composed of a plurality of load cells is also called a load array, wherein the coils of adjacent load cells then at least partially overlap. Load arrays of this type are known in principle from the prior art. The greater the number of load cells in a load array, the greater the surface area available for charging. By means of the bidirectional communication between the electrical device to be charged and the charging device, and the provision of the changeover switches and a plurality of demodulators, the position of the electrical device to be charged can be determined, and so the most suitable load cell or cells for charging said device is/are then activated. Foreign objects in the region of individual load cells can be detected by means of the abovementioned configuration, and so the load cells which are spatially nearest are not activated.

The invention claimed is:

1. A charging device for charging an energy storage device of a portable electrical device, the charging device comprising:
   at least one load cell having a controllable resonant circuit for inductively transferring energy;
   said at least one load cell having a parallel resonant circuit with a first coil and a second coil and two controllable switching elements for self-oscillation of said parallel resonant circuit, wherein said parallel resonant circuit is supplied with a controllable supply voltage;
   controllable switch-off elements for connecting control connections of said two controllable switching elements to each other, wherein the self-oscillation is interruptible in a targeted manner in order to modulate an amplitude of an electromagnetic field generated by said first coil and said second coil; and
   a demodulator connected to an output of said parallel resonant circuit, said output being formed by a coil end of said first coil, wherein said coil end is not connected to a coil end of said second coil and wherein said output forms an output of said at least one load cell.

2. The charging device according to claim 1, wherein said first coil and said second coil are flat coils.

3. The charging device according to claim 1, wherein said parallel resonant circuit is a self-oscillating push-pull oscillator.

4. The charging device according to claim 1, wherein control connections of said controllable switch-off elements have a same control signal applied thereto.

5. The charging device according to claim 1, wherein said control connections of said two controllable switching elements of said parallel resonant circuit are connectable to a reference potential via load paths of said controllable switch-off elements.

6. The charging device according to claim 1, wherein the first coil and the second coil at least partially overlap.

7. The charging device according to claim 1, further comprising a controllable voltage regulator providing the controllable supply voltage, wherein an amount of energy transferable to the parallel resonant circuit is controlled as a function of a level of the controllable supply voltage.

8. The charging device according to claim 7, further comprising a microcontroller to generate control signals for said controllable voltage regulator and control connections of said controllable switch-off elements.

9. The charging device according to claim 8, wherein said microcontroller is connected to an output of said demodulator, wherein a demodulation signal can be fed to said microcontroller for processing.

10. The charging device according to claim 1, wherein said at least one load cell is one of a plurality of load cells.

11. The charging device according to claim 10, wherein said first coil and said second coil of one of said plurality of load cells are arranged to at least partially overlap said first coil and said second coil of an adjacent one of said plurality of load cells.

12. The charging device according to claim 10, wherein a respective output of said plurality of load cells is coupled to an input of said demodulator via a capacitor.

13. The charging device according to claim 12, wherein at least two demodulators are provided, the inputs of said demodulators being connectable to a respective output of said plurality of load cells via an associated changeover switch, wherein one of said plurality of load cells is connected to one of the demodulators and, the other ones of said plurality of load cells are connected in sequence to another one of said at least two demodulators.

14. A method for charging a portable electric device, the method comprising:
providing a charging device according to claim 1 for charging the portable electric device; and
switching, with the controllable switch-off elements, the self-oscillation of the parallel resonant circuit on or off according to a predefined data protocol, and providing the controllable supply voltage for the load cell with a voltage regulator, for interrupting the self-oscillation of the parallel resonant circuit and modulating the amplitude of the electromagnetic field generated by the first coil and the second coil.

* * * * *